United States Patent
Lee (10) Patent No.: US 6,692,885 B2
(45) Date of Patent: Feb. 17, 2004

(54) METHOD OF FABRICATING BARRIER RIBS IN PLASMA DISPLAY PANEL

(75) Inventor: Myung-Won Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/034,509

(22) Filed: Dec. 28, 2001

(65) Prior Publication Data

US 2002/0086246 A1 Jul. 4, 2002

(30) Foreign Application Priority Data

Dec. 30, 2000 (KR) ........................... 2000/87095

(51) Int. Cl.$^7$ ............................. H01J 9/00
(52) U.S. Cl. .................. 430/198; 430/321; 445/24
(58) Field of Search ......................... 430/320, 321, 430/323, 330, 198; 445/24; 313/582, 584, 586

(56) References Cited

U.S. PATENT DOCUMENTS

| 5,723,945 A | 3/1998 | Schermerhorn |
| 5,997,377 A | 12/1999 | Sagara et al. |
| 6,511,793 B1 * | 1/2003 | Cho et al. .............. 430/323 |

FOREIGN PATENT DOCUMENTS

| JP | 10-302652 A | * 11/1998 |
| JP | 2000301500 | 10/2000 |
| JP | 2000-301500 A | * 10/2000 |

* cited by examiner

Primary Examiner—John A. McPherson
(74) Attorney, Agent, or Firm—Lee, Hong, Degerman, Kang & Schmadeka (57) ABSTRACT

Disclosed is a method of fabricating barrier ribs in a plasma display panel using photosensitive glass powder includes the steps of preparing photosensitive glass powder by reducing a photosensitive glass material to fine powder, putting the photosensitive glass powder or the photosensitive glass powder mixed with a UV-ray transmitting organic material in a mold, aligning a photomask over the photosensitive glass powder and carrying out exposure thereon, carrying out first and second thermal treatment on the photosensitive glass powder so as to generate different crystalline phases at exposed and non-exposed portions, respectively, and forming barrier ribs by etching the portion where the crystalline phase is generated.

8 Claims, 6 Drawing Sheets

METHOD OF FABRICATING BARRIER RIBS IN PLASMA DISPLAY PANEL

BACKGROUND OF THE INVENTION

1. Field of the Invention

The present invention relates to a method of fabricating barrier ribs in a plasma display panel enabling to form barrier ribs of high precision and resolution for a large screen using photosensitive glass powder.

2. Background of the Related Art

Generally, a plasma display panel (hereinafter abbreviated PDP) is manufactured by arranging cathode and anode electrodes between a pair of glass substrates confronting each other to cross each other, injecting a discharge gas between the substrates, and sealing the substrates. PDP displays a predetermined image by applying a predetermined voltage between the cathode and anode electrodes so as to bring about gas discharge at a crossing of the electrodes. PDP has been used for a monitor of OA appliance. Lately, many efforts are made to apply PDP to the wall-hanging TV and the next generation HDTV and the like with colorization. Compared to LCD, PDP provides a large-scaled screen with ease so as to expand to be applied to various fields such as various displays and the like.

Figure 1:
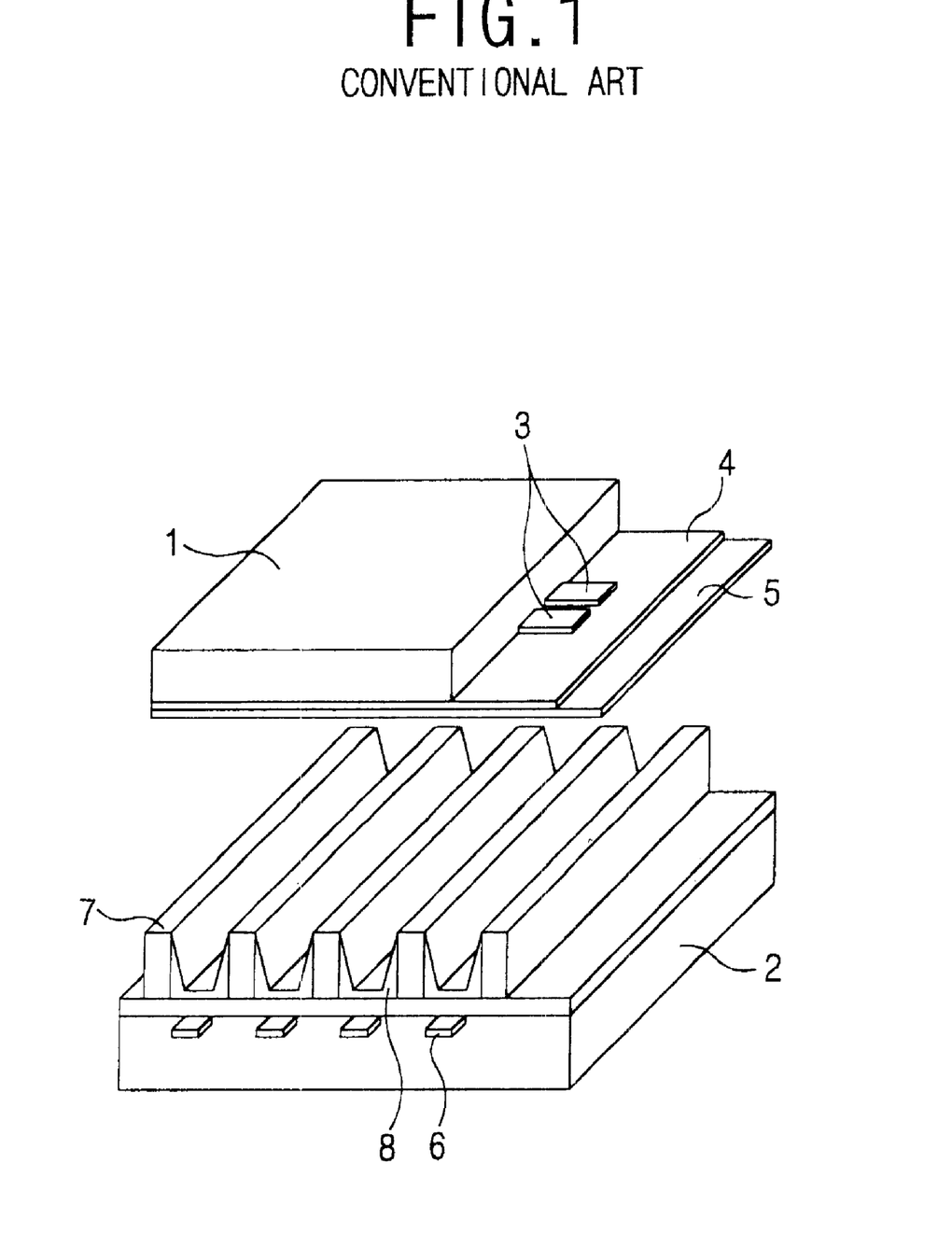
FIG. 1 illustrates a general AC type PDP.

FIG. 1 illustrates an AC type PDP which is widely produced.

Referring to FIG. 1, PDP includes a pair of glass substrates. In this case, a front glass substrate is called a front substrate and the other glass substrate at the rear of the front substrate is called a rear substrate 2.

On the front substrate 1 of the AC type PDP, formed are transparent electrodes 3 for discharge and bus electrodes (attached to the transparent electrodes) to reduce line resistance of the transparent electrodes 3 by bringing about discharge opposite to the transparent electrodes 3.

And, a transparent dielectric layer 4 and a protecting layer 5 to protect the electrodes are formed on the front substrate 1. The protecting layer 5 maintains a discharge state by releasing electrons during discharge so as to control an excessive discharge current. On the rear substrate 2, barrier ribs 7 as partition walls to provide discharge spaces are formed like stripes over data electrodes 6 for writing. Inside each of the discharge spaces, fluorescent layers 8 of RGB three colors are arranged regularly for luminescence and colorization of visible rays.

The front and rear substrates 2 are bonded together by a seal layer. After maintaining a vacuum state between the substrates, a gas is injected between the bonded glass substrates so as to generate ultraviolet rays during discharge. A mixed gas such as He+Xe or Ne+Xe is mainly used for the injected gas. Modules such as driver IC and the like are installed at the above structure, thereby completing the AC type PDP.

In the AC type PDP, the barrier ribs 7 secures discharge spaces, prevents the 3-colored fluorescent layers 3 from being mixed each other, and prevents electric and optical crosstalk between discharge cells. Therefore, the barrier ribs 8 become an important factor to increase display quality and luminescence efficiency. As a panel requires large scale and high precision & resolution, many efforts are made to study the barrier ribs.

In order to fabricate the barrier ribs, there are screen printing, sand blasting, additive method, LTCCM (low temperature cofired ceramic on metal) which is used embossing, and the like.

Screen printing carries out the steps of screen-printing a rib material and drying the printed rib material 8 to 10 times so as to stack the rib material up to a designed height. After printing the rib material, a next layer is printed thereon during a natural drying process before the previously printed rib material fails to be dried up. Thus, it is very important haw far the printed rib material runs dry. Screen printing has advantages such that a screen printer is not expensive and that the material is not wasted. Namely, the rib material is printed on the designed spots only. Yet, it is very difficult to make the heights of the respective ribs uniform due to a number of printings. Besides, the pattern of the ribs fails to meet the requirement of the product such as high precision and fine resolution.

Originally, sand blasting is used for engraving letters on a tombstone or sculpturing a glass, in which sands are jetted on a stone so that the frictional energy of the sands carves the stone. Sand blasting enables to form a micro pattern using photolithography as well as form the ribs on a large-scaled substrate. Yet, sand blasting fails to prevent cracks in the glass substrate due to the impact of an abradant thereon.

In the additive method, a photoresist film is attached on a glass substrate, and exposure and development are carried out on the photoresist film so as to leave portions of the film between patterns which will become the ribs. A rib material charges the spaces and runs dry. After removing the photoresist film, the rib material is plasticized so as to complete the ribs. Such an additive method requires no sand blaster, thereby preventing massive dusts. And, the additive method is suitable for forming the ribs on a large-scaled substrate. Yet, the additive method has difficulty in separating the photoresist from a glass paste so as to leave residues. Besides, the barrier ribs may collapse during formation.

And, compared to other methods, LTCCM has a simple process.

FIG. 2A to FIG. 2H illustrate a process of fabricating barrier ribs using LTCCM.

Figure 2A:
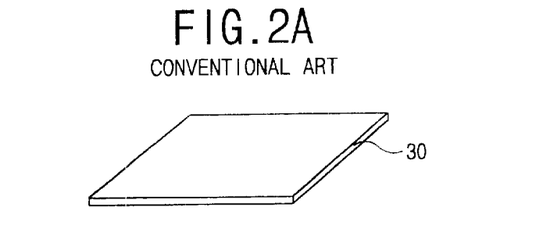
FIG. 2A to FIG. 2H illustrate a process of fabricating barrier ribs using LTCCM.
Figure 2B:
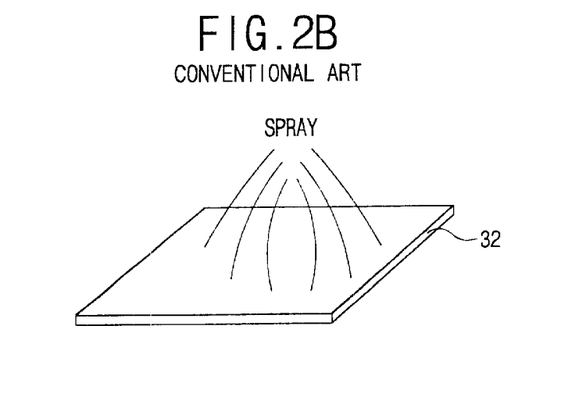

Referring to FIG. 2A, a green sheet 30 is prepared. The green sheet 30 is prepared by putting a slurry, which is formed by mixing glass powder, organic solvent, plasticizer, binder, additive and the like together with a predetermined ratio, on a polyester film, forming the slurry as a sheet figure by doctor blade, and carrying out a drying process thereon. A substrate 32 to which the green sheet 30 is bonded is formed of metal such as titanium. Titanium is superior to glass or ceramic material in degree of strength and thermal resistance, thereby enabling to be prepared thinner than the glass or ceramic materials as well as reduce thermal and mechanical distortion.

Figure 2C:
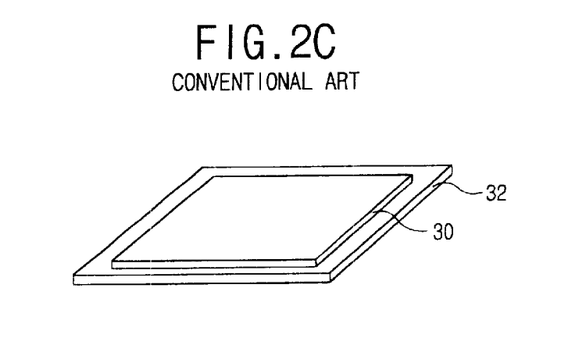

Referring to FIG. 2C, glass powder, which is grinded finely and dried, is sprayed on the metal substrate 32 and dried before bonding the substrate 32 and green sheet 30 together so as to ease the conjunction between the metal substrate 32 and green sheet 30. The sprayed fine glass powder is melted to be adsorbed on a surface of the substrate 32 by heat treatment at 500 to 600° C.

Referring to FIG. 2C, the green sheet 30 is bonded to the substrate 32, on which the glass powder is adsorbed, by lamination.

Figure 2D:
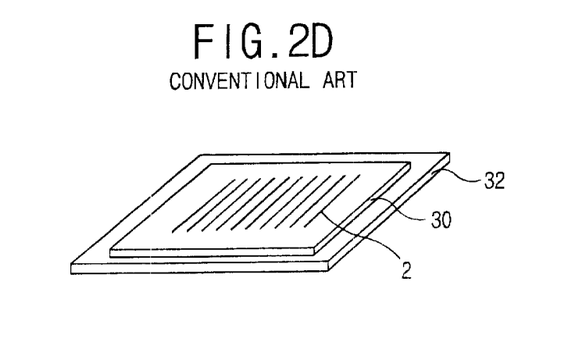

Referring to FIG. 2D, address electrodes 2 are patterned on the green sheet 30. The green sheet 30 is then dried.

Figure 2E:
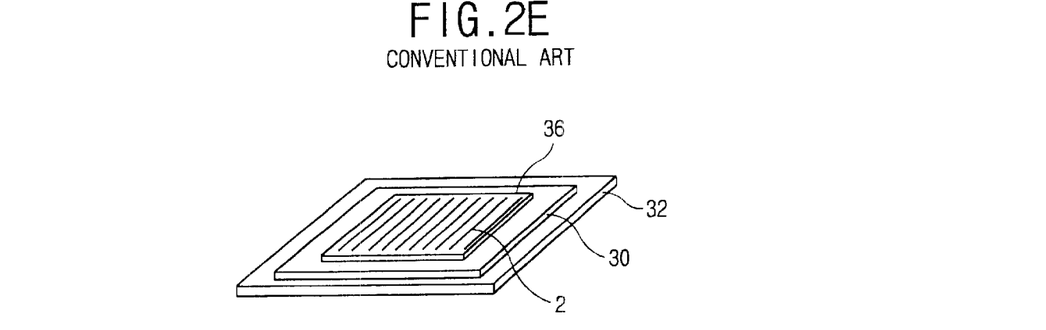

Referring to FIG. 2E, dielectric slurry is printed on the substrate 30 on which the address electrodes 2 have been formed. And, the dielectric slurry is dried. Thus, an electrode passivation layer 36 is formed. After the formation of the electrode passivation layer 36, a second laminating is carried out so as to increase adhesiveness between the electrode passivation layer 36 and the green sheet 30 having the address electrodes 2.

In order to increase liquidity of the green sheet 30 bonded to the substrate 32, the substrate is heated at a temperature below a softening point of the organic material used as a binder.

Figure 2F:
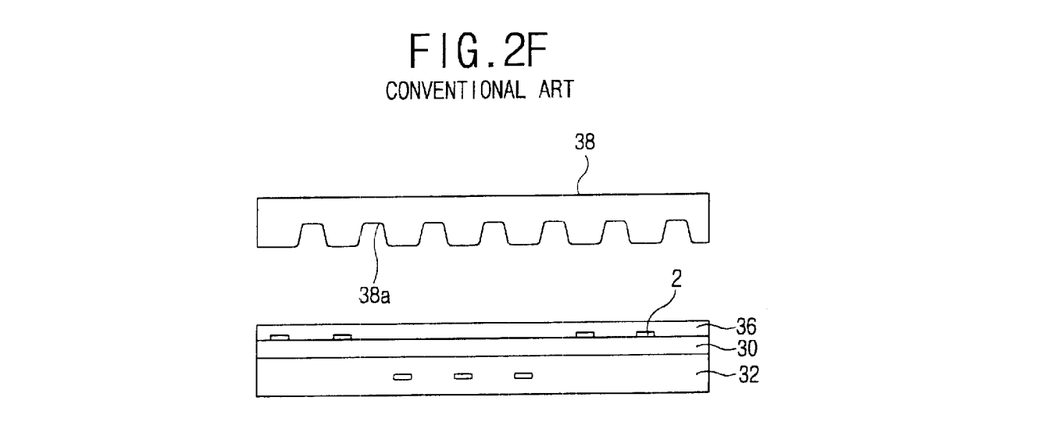

Referring to FIG. 2F, the green sheet 30 of which liquidity is increased is aligned on a metallic pattern 38 having grooves 38a which have counter-figures of barrier ribs to be formed.

Figure 2G:
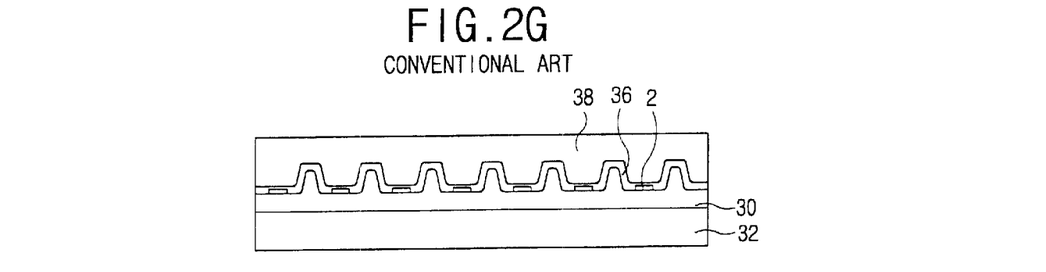

Referring to FIG. 2G, the metallic pattern 38 is pressed by a pressure over 150 Kgf/cm$^2$ so that the green sheet 30 and electrode passivation layer 36 fill the grooves 38a of the metallic pattern 38.

Figure 2H:
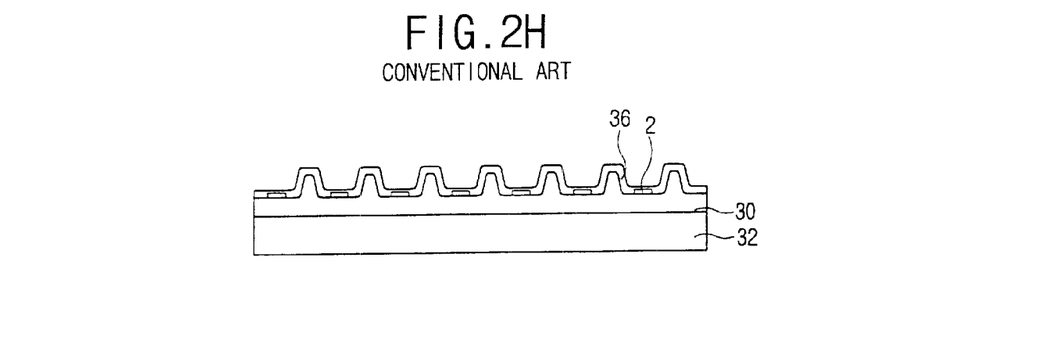

Referring to FIG. 2H, the metallic patter 38 is separated from the green sheet 30 and electrode passivation layer 36. Barrier ribs are then formed through heating-maintaining-cooling steps.

LTCCM has an advantage of forming the barrier ribs with ease. Yet, LTCCM has difficulty in selecting a composition of a green sheet enabling to lower the metallic pattern pressure for the formation of the barrier ribs. Besides, the heights of the respective barrier ribs become irregular if the metallic pattern pressure forced on the substrate is not even. Hence, LTCCM requires an extra grinding process to secure the uniform heights of the respective barrier ribs.

Proposed for forming the barrier ribs are LIGA (lithography +electroplating +molding), anistropic silicon etch, photosensitive glass substrate etch, and the like.

LIGA is carried out by changing property of a portion of a resin material to which an X-ray generated from an accelerator is applied and removing the irradiated portion by etch. The structure is constructed by such a manner. In certain case, the structure is formed as a first metallic pattern. A second metallic pattern is formed by pouring a liquid plastic on the first metallic pattern. And, electroplating is carried out on the second metallic pattern so as to construct a designed final structure. Yet, LIGA requires an expensive X-ray generator.

Anisotropic silicon etch is a method of forming a micro structure using a characteristic that a Si[110] substrate has a priority in etched in a vertical direction. Yet, anisotropic silicon etch has difficulty in forming micro structures such as barrier ribs on a large-scaled surface as well as using expensive single-crystalline silicon.

Photosensitive glass substrate etch is originated from Dalton who has found the phenomenon that Cu shows a Ruby color owing to extraction after heat treatment by the reduction of Cu particles. Photosensitive glass experiences a selective crystal growth by metal particles after over-run. Photosensitive glass includes LAS (lithium alumina silicate) based glass containing Ag, to which Ce is added to increase photosensitivity.

FIG. 3A to FIG. 3D illustrate cross-sectional views of etching a photosensitive glass substrate.

Figure 3A:
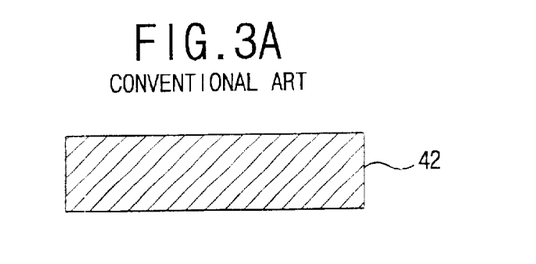
FIG. 3A to FIG. 3D illustrate cross-sectional views of etching a photosensitive glass substrate.

Referring to FIG. 3A, a mask pattern 44 is formed on a photosensitive glass substrate 42. The photosensitive glass substrate 42 mainly consists of $SiO_2$ and $LiO_2$ to which $CeO_2$, $Al_2O_3$, and a small amount of AgCl and $K_2O$ are added.

Figure 3B:
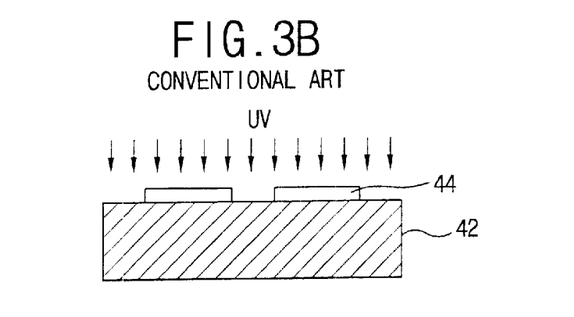

Referring to FIG. 3B, exposure is carried out on the substrate by a light source generating UV-rays having a predetermined wavelength. Thermal treatment is then carried out on the substrate.

Figure 3C:
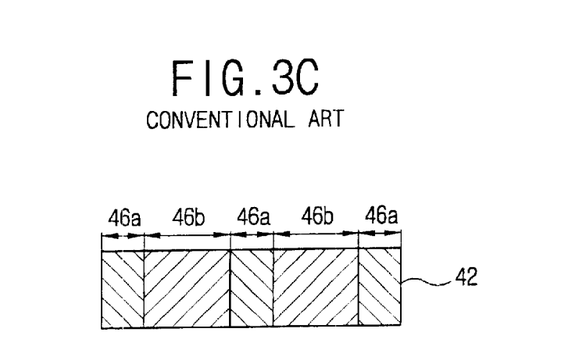

Referring to FIG. 3C, through such thermal treatment, lithium metasillicate grows from the exposure portion 46a of the glass substrate.

Figure 3D:
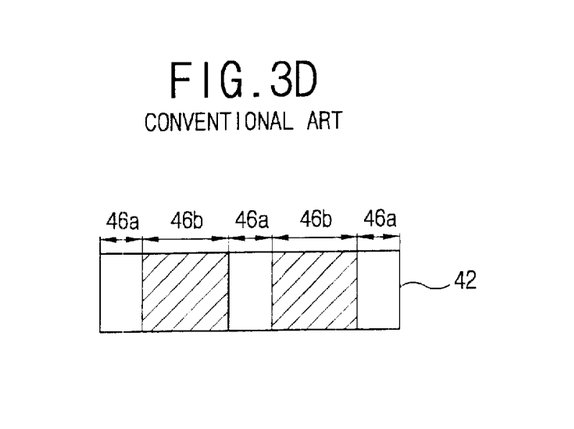

Referring to FIG. 3D, wet etch is carried out on the exposure portion 46a, where crystalline phase is extracted, by dipping the substrate in a solution containing HF for a predetermined time. The exposure portion 46a where the crystalline phase is extracted differs from the non-exposure portion 46b in the state of $LiO_2$—$SiO_2$ chains, thereby being etched abruptly.

Unfortunately, the photosensitive glass substrate etching method has difficulty in preparing a large-scaled photosensitive glass substrate having a bulk type glass composition of soda-lime as well as repeating thermal treatment and etch for sufficient extraction of the crystalline phase.

SUMMARY OF THE INVENTION

Accordingly, the present invention is directed to a method of fabricating barrier ribs in a plasma display panel that substantially obviates one or more problems due to limitations and disadvantages of the related art.

An object of the present invention is to provide a method of fabricating barrier ribs in a plasma display panel enabling to form barrier ribs of high precision and resolution for a large screen using photosensitive glass powder.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of fabricating barrier ribs in a plasma display panel according to the present invention includes the steps of preparing photosensitive glass powder by reducing a photosensitive glass material to fine powder, putting the photosensitive glass powder or the photosensitive glass powder mixed with a UV-ray transmitting organic material in a mold, aligning a photomask over the photosensitive glass powder and carrying out exposure thereon, carrying out first and second thermal treatment on the photosensitive glass powder so as to generate different crystalline phases at exposed and non-exposed portions, respectively, and forming barrier ribs by etching the portion where the crystalline phase is generated. Thereafter, glass ceramic which having barrier rib shape is adhered to Aluminum plate by using a thermal-conductive polymer (ex. Dowcorning 4173A) to improve thermal-defect and external impact strength.

In another aspect of the present invention, a method of fabricating barrier ribs in a plasma display panel includes the steps of preparing photosensitive glass powder by reducing a photosensitive glass material to fine powder, putting the photosensitive glass powder in a predetermined mold, aligning a mask pattern over the photosensitive glass powder and carrying out exposure on the photosensitive glass powder, carrying out a first thermal treatment on the photosensitive glass powder so as to generate a crystalline phase at either an exposure portion or a non-exposure portion of the photosensitive glass powder, and forming barrier ribs by etching the portion where the crystalline phase is formed.

In a further aspect of the present invention, a method of fabricating barrier ribs in a plasma display panel includes the steps of preparing photosensitive glass powder by reducing a photosensitive glass material to fine powder, printing a paste formed of the photosensitive glass powder and an organic material on a substrate and drying the paste, aligning a photomask over the dried paste and carrying out exposure on the dried paste, carrying out a first thermal treatment on the exposed paste so as to generate a crystalline phase at either an exposure portion or a non-exposure portion of the exposed paste, and forming barrier ribs by etching the portion where the crystalline phase is formed.

Accordingly, a method of fabricating barrier ribs in a plasma display panel according to the present invention requires no green sheet of which selection for a composition ratio is difficult in LTCCM, and enables to form micro barrier ribs using simple processes such as exposure and wet etch without causing any problem such as pressure concentration using a metallic pattern or uneven heights of the respective barrier ribs.

Moreover, a method of fabricating barrier ribs in a plasma display panel according to the present invention, which uses finely-reduced powder of photosensitive glass, enables to prepare a photosensitive glass plate with ease, extract crystalline phases, and reduce thermal treatment and etch time for extracting the crystalline phase sufficiently.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment (s) of the invention and together with the description serve to explain the principle of the invention.

In the drawings.

DETAILED DESCRIPTION OF THE INVENTION

Reference will now be made in detail to the preferred embodiments of the present invention, examples of which are illustrated in the accompanying drawings.

FIG. 4A to FIG. 4E illustrate cross-sectional views of fabricating barrier ribs in PDP according to a first embodiment of the present invention.

Figure 4A:
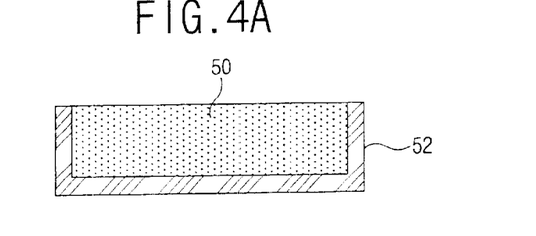
FIG. 4A to FIG. 4E illustrate cross-sectional views of fabricating barrier ribs in PDP according to a first embodiment of the present invention.

Referring to FIG. 4A, photosensitive glass powder 50 is put into a mold 52. The photosensitive glass powder 50 is prepared by reducing a photosensitive glass material to powder. In this case, the photosensitive glass powder 50 mainly consists of $SiO_2$, $LiO_2$, $K_2O$, $Al_2O_3$, and the like, to which small amounts of AgCl, $CeO_2$, and the like are added. Preferably, the photosensitive glass powder includes $SiO_2$ of 55~78 wt %, $LiO_2$ of 14~28 wt %, $K_2O$ of 0~5 wt %, $Al_2O_3$ of 0.1~3 wt %, AgCl of 0~1 wt %, and $CeO_2$ of 0~1 wt %. More preferably, the photosensitive glass powder includes $SiO_2$ of 72.8 wt %, $LiO_2$ of 23 wt %, $K_2O$ of 3 wt %, $Al_2O_3$ of 1.4 wt %, AgCl of 0.0008 wt %, and $CeO_2$ of 0.0006 wt %.

A grain size of the photosensitive glass powder 50 preferably becomes several μm. And, the mold 52 has a recess having a predetermined area and depth corresponding to the size and thickness of the demanded substrate. The photosensitive glass powder 50 comes into filling the recess.

Figure 4B:
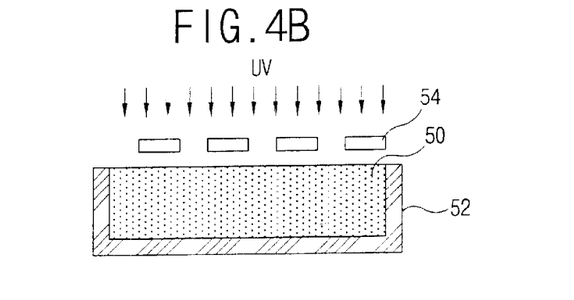
Figure 4C:
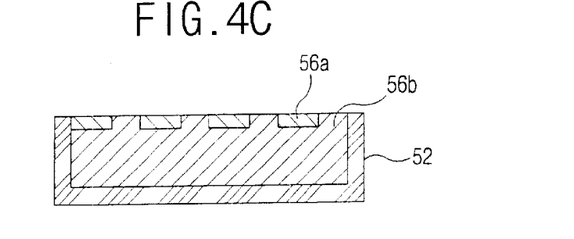

Referring to FIG. 4B and FIG. 4C, a surface of the photosensitive glass powder 50 put in the mold 52 is planarized, and then compressed by a predetermined pressure. A photomask 54 is aligned over the planarized glass powder 50.

Exposure with UV-rays is carried out on the photosensitive glass powder 50 through the aligned photomask 54. Thermal treatment is then carried out on the photosensitive glass powder at a temperature over a softening point so as to prepare a glass plate 58. Nuclei are formed at the exposure portion 56a of the glass plate 58 during thermal treatment at 490° C.~550° C. And, lithium metasillicate crystal of milky color further grows at 600° C.~680° C.

Figure 4D:
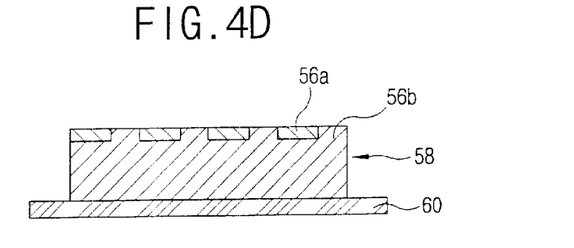

After separating the glass plate 58 from the mold 52, as shown in FIG. 4D, the glass plate 58 is bonded to a metal substrate 60 of titanium.

Figure 4E:
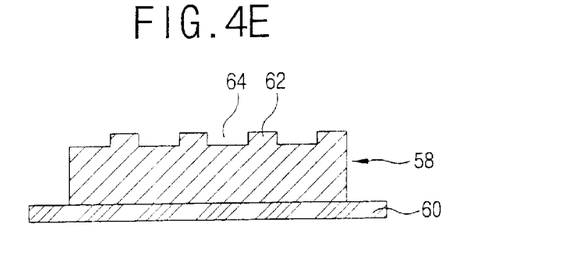

Subsequently, wet etch is carried out on the glass plate 58 having the crystalline phase by dipping the glass plate 58 in a solution containing HF for a predetermined time. In this case, an etch rate of the exposure portion 56a is tens of times faster than that of the non-exposure portion 56b in HF. As a result after an elapse of a predetermined time, as shown in FIG. 4E, the exposure portion 56a provides discharge spaces 64, while the non-exposure portion 56b becomes barrier ribs 62 on the glass plate 58.

Finally, thermal treatment is carried out on the glass plate 54 having the barrier ribs 62 and discharge spaces 64 for crystallization at a predetermined temperature until a demanded heat expansion coefficient is attained.

FIG. 5A to FIG. 5D illustrate cross-sectional views of fabricating barrier ribs in PDP according to a second embodiment of the present invention.

Figure 5A:
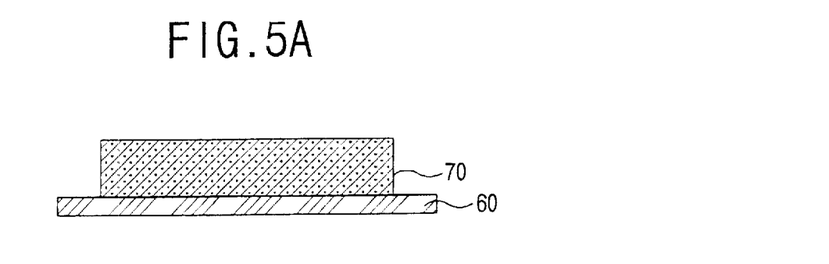
FIG. 5A to FIG. 5D illustrate cross-sectional views of fabricating barrier ribs in PDP according to a second embodiment of the present invention.

Referring to FIG. 5A, a photosensitive glass material is reduced to fine powder. And, the reduced photosensitive glass powder is mixed with an organic material with a predetermined ratio so as to be processed as a paste. Such a processed paste is printed on a substrate 60, and then dried for a while.

Figure 5B:
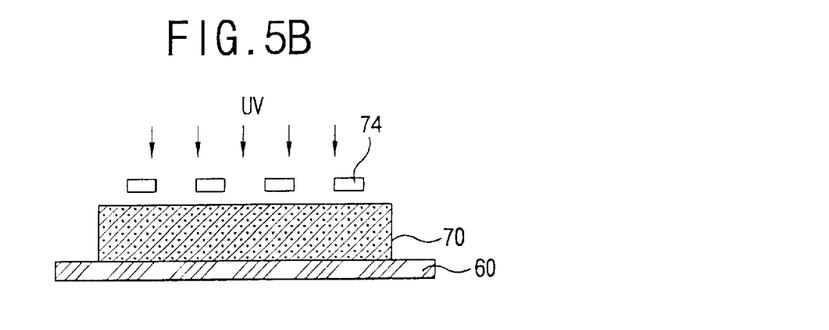
Figure 5C:
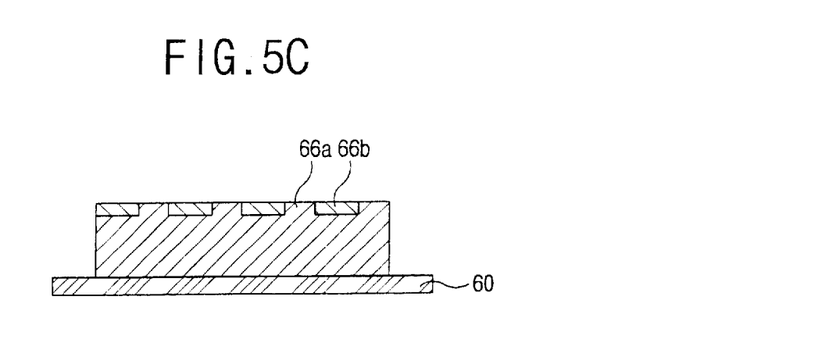

After a photomask 54 has been aligned over the substrate, a photosensitive glass paste 70 is exposed to UV-rays. First and second thermal treatments are then carried out on the photosensitive glass paste 70 successively. In this case, the first thermal treatment burns out the organic material contained in the photosensitive glass paste 70. During the second thermal treatment, as shown in FIG. 5C, nuclei are formed at the exposure portion 66a at 490° C.~550° C., and lithium metasillicate crystal of milky color further grows at 600° C.~680° C.

Figure 5D:
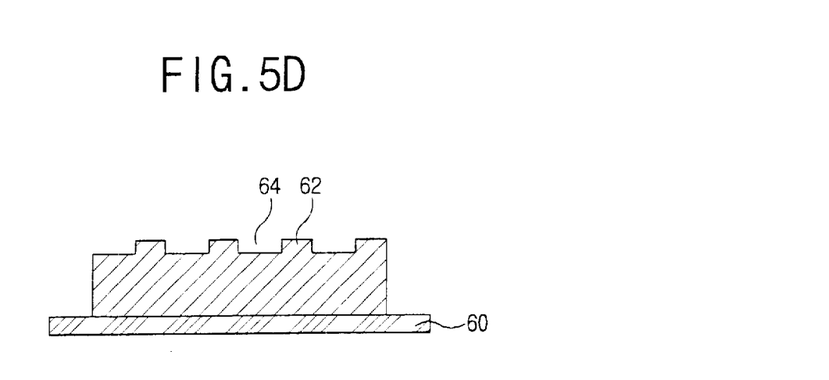

Then, wet etch is carried out by dipping the glass paste 70 in a solution containing HF for a predetermined time so as to remove the exposure portion 66a. In this case, an etch rate of the exposure portion 66a is tens of times faster than that of the non-exposure portion 66b having a structure denser than that of the exposure portion 66a in HF. As a result after an elapse of a predetermined time, as shown in FIG. 5D, the exposure portion 66a provides discharge spaces 64, while the non-exposure portion 66b becomes barrier ribs 62.

Finally, thermal treatment is carried out so as to crystallize the barrier ribs 62 and base layer at a predetermined temperature until a demanded heat expansion coefficient is attained.

Accordingly, a method of fabricating barrier ribs in a plasma display panel according to the present invention requires no green sheet of which selection for a composition ratio is difficult in LTCCM, and enables to form micro barrier ribs using simple processes such as exposure and wet etch without causing any problem such as pressure concentration using a metallic pattern or uneven heights of the respective barrier ribs.

Moreover, a method of fabricating barrier ribs in a plasma display panel according to the present invention, which uses finely-reduced powder of photosensitive glass, enables to prepare a photosensitive glass plate with ease, extract crystalline phases, and reduce thermal treatment and etch time for extracting the crystalline phase sufficiently.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of fabricating barrier ribs in a plasma display panel, comprising the steps of:

preparing photosensitive glass powder by reducing a photosensitive glass material to fine powder;

putting the photosensitive glass powder in a predetermined mold;

aligning a mask pattern over the photosensitive glass powder and carrying out exposure on the photosensitive glass powder;

carrying out a first thermal treatment on the photosensitive glass powder so as to generate a crystalline phase at either an exposure portion or a non-exposure portion of the photosensitive glass powder; and forming barrier ribs by etching the portion where the crystalline phase is formed.

2. The method of claim 1, wherein major components of the photosensitive glass powder are $SiO_2$, $LiO_2$, $K_2O$, and $Al_2O_3$.

3. The method of claim 1, wherein major components of the photosensitive glass powder are $SiO_2$, $LiO_2$, $K_2O$, and $Al_2O_3$ and further include at least one of AgCl and $CeO_2$.

4. The method of claim 3, wherein the photosensitive glass powder includes $SiO_2$ of 55~78 wt %, $LiO_2$ of 14~28 wt %, $K_2O$ of 0~5 wt %, $Al_2O_3$ of 0.1~3 wt %, AgCl of 0~1 wt %, and $CeO_2$ of 0.0006 wt %.

5. The method of claim 4, wherein the photosensitive glass powder includes $SiO_2$ of 72.8 wt %, $LiO_2$ of 23 wt %, $K_2O$ of 3 wt %, $Al_2O_3$ of 1.4 wt %, AgCl of 0.008 wt %, and $CeO_2$ of 0.0006 wt %.

6. The method of claim 1, wherein the crystalline phase is formed at the exposure portion.

7. The method of claim 1, wherein the portion where the crystalline phase is formed is removed by an etchant containing HF.

8. The method of claim 1, further comprising a step of crystallizing the photosensitive glass powder from which the crystalline phase is removed using a second thermal treatment.

* * * * *